United States Patent [19]

Carswell et al.

[11] Patent Number: 4,695,018
[45] Date of Patent: Sep. 22, 1987

[54] CABLE HANGER

[75] Inventors: Joseph Carswell, Morganton; Louis Ance, Newton, both of N.C.

[73] Assignee: BRIntec Corp., Willimantic, Conn.

[21] Appl. No.: 818,872

[22] Filed: Jan. 14, 1986

[51] Int. Cl.⁴ .............................................. F16L 3/08
[52] U.S. Cl. .................................. 248/74.2; 188/65.1; 24/130
[58] Field of Search ....................... 248/65, 74.1, 74.2, 248/74.5, 110, 111, 113, 309.1, 314, 316.1, 316.2, 316.7, 316.8; 174/135, 168; 188/65.1; 24/130

[56] References Cited

U.S. PATENT DOCUMENTS

| 1,606,487 | 11/1926 | Wamsley | 248/113 |
| 2,936,992 | 5/1960 | Browning | 248/499 |
| 3,288,407 | 11/1966 | Downer | 174/153 G |
| 3,574,900 | 4/1971 | Emery | 24/130 |
| 3,629,909 | 12/1971 | Riley | 24/130 |
| 4,163,372 | 8/1979 | Frye | 24/130 |
| 4,424,406 | 1/1984 | Slater | 174/65 R |
| 4,430,523 | 2/1984 | Hayes | 174/135 |
| 4,461,059 | 7/1984 | Bury | 24/129 R |

FOREIGN PATENT DOCUMENTS 2550939 5/1977 Fed. Rep. of Germany ...... 174/135

Primary Examiner—J. Franklin Foss
Assistant Examiner—Robert A. Olson
Attorney, Agent, or Firm—McCormick, Paulding & Huber

[57] ABSTRACT

A cable hanger for gripping and securing in fixed position an axially elongated portion of a cable has a mounting base and a pair of combs which project from the base at opposite sides of an axial plane extending through the base. Each comb has a plurality of integral generally parallel resilient blade-like fingers. The free ends of the fingers on the two combs are arranged in opposing spaced apart relation to each other to receive and grip a cable therebetween when the axis of the cable is disposed generally within said axial plane.

5 Claims, 7 Drawing Figures

CABLE HANGER

BACKGROUND OF THE INVENTION

This invention relates in general to cable supporting devices and deals more particularly with an improved cable rack or hanger for mounting on the wall of a manhole, cable raceway, building, or the like, to grip and hold a portion of an axially elongated conducting cable in a fixed position relative to the wall. The present cable hanger is particularly adapted to firmly grip and hold cable of a type which may be easily damaged, as, for example, fiber optic or plenum cable. While the cable hanger of the present invention is particularly adapted for use as a supporting device in a cable installation it may also be used as a bench fixture to hold a portion of a cable in a relatively stationary position while an adjacent portion of the cable is prepared for splicing or termination.

The general aim of the present invention is to provide an improved cable hanger of the aforedescribed general type particularly adapted to firmly grip and hold fiber optic or plenum cable. A further aim of the invention is to provide an improved cable hanger to support cable in a range of sizes and which does not require adjustment. Yet another aim of the invention is to provide an improved cable hanger to rapidly grip and hold or release a cable and without applying excessive holding force to the cable to avoid risk of damage to the cable jacket or core and which allows unidirectional adjustment of the cable position cable relative to the hanger. A still further aim of the invention is to provide a hanger which may be easily installed or rearranged and which will firmly grip a cable having a smooth or extremely slippery jacket surface.

SUMMARY OF THE INVENTION

In accordance with the present invention a cable hanger is provided for mounting on a supporting surface to grip and securely hold in fixed position relative to the supporting surface an axially elongated portion of a cable. The hanger comprises a mounting base, two sets of fingers, and means for mounting the fingers of each of the sets on the base at opposite sides of an axial plane with the free ends of the fingers in opposing spaced apart relation to each other to receive a cable therebetween and grip and hold the cable with its axis disposed generally within said axial plane.

DETAIL DESCRIPTION OF PREFERRED EMBODIMENT

Figure 1:
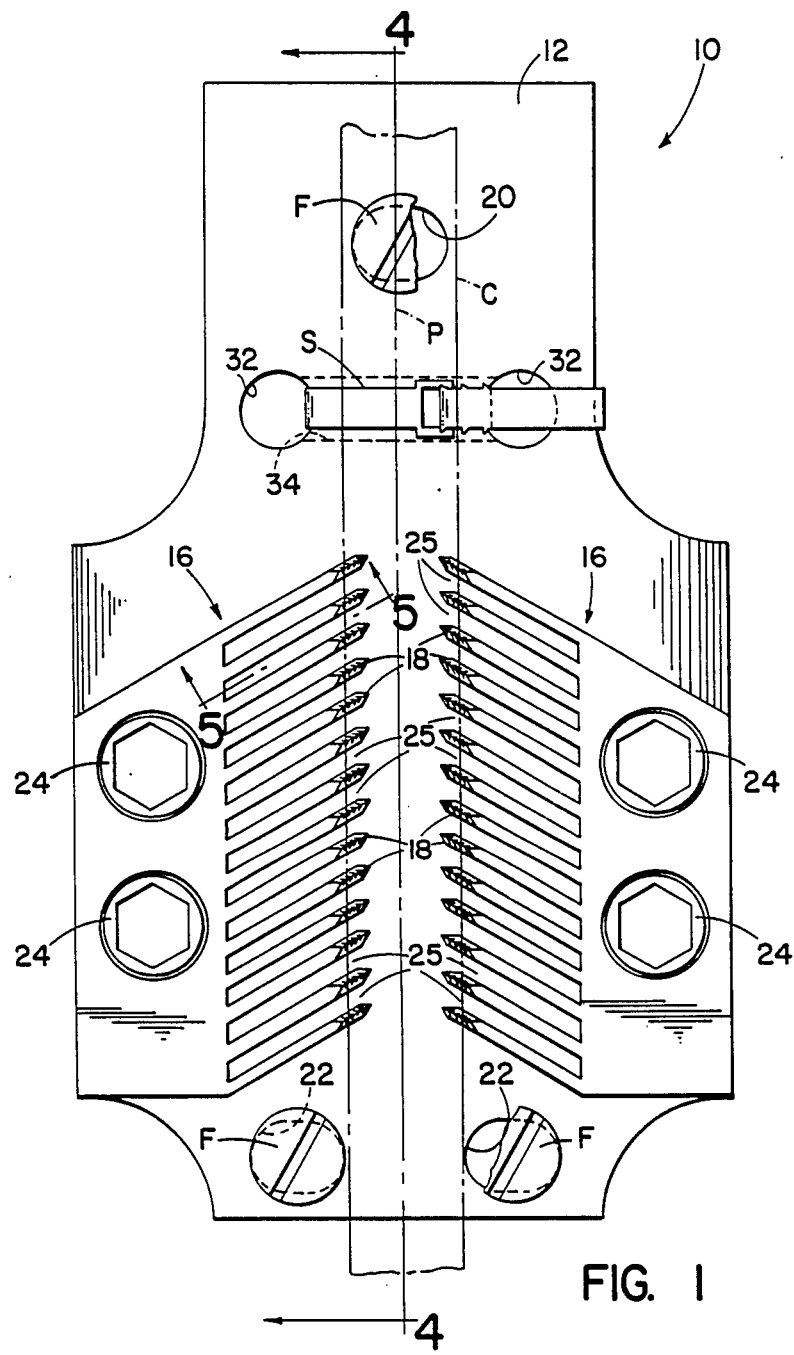
FIG. 1 is a front elevational view of a cable hanger embodying the present invention.
Figure 2:
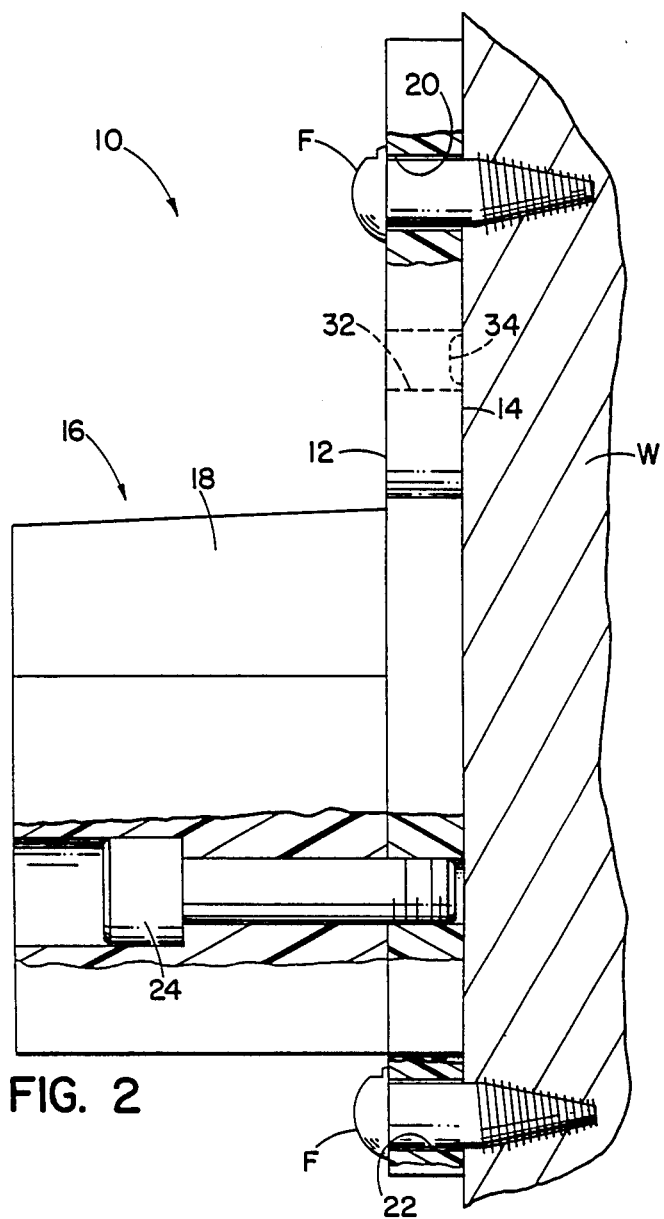
FIG. 2 is a side elevational view of the cable hanger of FIG. 1 shown partially broken away.

Turning now to the drawings, and referring first particularly to FIG. 1–4, a cable hanger embodying the present invention is indicated generally by the reference numeral 10. The illustrated cable hanger 10 is particularly adapted for mounting on the surface of a wall, such as the wall of a cable raceway in a high rise building, to grip and hold an axially elongated portion of an associated conducting cable such as a plenum cable or a fiber optic cable containing a plurality of glass conductors which may be easily damaged by application of excessive pressure to the cable jacket.

In the drawings the hanger 10 is shown mounted on the vertically disposed surface of a wall indicated by the letter W. The hanger is particularly adapted to grip and hold an associated portion of an axially elongated vertically extending cable indicated by the letter C (FIG. 1), which may, for example, comprise a fiber optic cable of a well known type. The illustrated cable hanger 10 may be made from any suitable material, but is preferably it is made from a dielectric material and essentially comprises a mounting base or plate 12, which has a substantially planar rear mounting surface 14. Two sets of combs, indicated generally at 16,16 and which include opposing flexible resilient blades or fingers 18,18, are supported on the base 12 at opposite sides of an axial plane P, which, as shown, intersects a central portion of the mounting base 12 in normal relation to the mounting surface 14. The cable C is received between the two sets of blade-like fingers 18,18 with its axis generally disposed within the plane P and is gripped at opposite sides by opposing fingers which exert light but firm holding force upon the cable jacket to retain the cable in fixed position within the hanger 10. However, if necessary, the cable may be readily released from the hanger, as will be hereinafter further discussed.

Considering now the cable hanger 10 in further detail, the illustrated base 12 is generally rectangular and has a plurality of apertures 20 and 22,22 which extend through it and open outwardly through its frontal surface for receiving associated fasteners such as the fasteners F,F which, as shown, secure the base to the wall W. The apertures 20 and 22,22 are preferably horizontally extending slots, as shown, which permit some generally lateral adjustment of the hanger 10 so that it may be accurately aligned with other hangers above and below it, but not shown in the drawings.

In accordance with the presently preferred construction, the fingers 18,18, which cooperate to hold a cable in fixed position relative to the base 12, comprise integral parts of the combs 16,16, which project forwardly from the frontal surface of the base 12 at opposite sides of the plane P. The manner in which the combs are attached to the base may vary and, if desired, the holder 10 may comprise a unitary structure molded from plastic or like material. However, the illustrated combs 16,16 are attached to the base 12 by threaded fasteners 24,24, substantially as shown, so that the fingers are free to move relative to the base. Each comb 16 has a series of parallel fingers 18,18 separated from each other by narrow slots 25,25. The outer ends of the fingers 18,18 are integrally connected to the supporting portion of the comb 16 which receives the associated fasteners 24,24. The combs are attached to the base 12 in opposing relation to each other and with the fingers thereof extending inwardly toward the plane P and in the direction of the upper end of the base 12. Thus, the fingers 18,18, when viewed from a position in front of the hanger as it appears in FIG. 1, form a generally chevron shaped pattern. Each pair of opposing fingers 18,18 converge upwardly toward an apex which lies within the plane P.

As viewed from below (FIG. 3) the ends of the opposing fingers 18,18 cooperate to define a generally V-shaped opening or groove 26 therebetween which opens outwardly through the front of the hanger 10 and converges in the direction of the base 12. Preferably, and as shown, the V-shaped groove has a uniform cross-section through its length. The apex of the V-shaped groove 26 is disposed within the plane P.

The inner ends of the fingers 18,18 on the presently preferred hanger 10 have relatively sharp edges 28,28 which extend along the opposing free end portions of the fingers. The free end portions of the fingers of each comb further define a series of opposing inwardly opening shallow notches or grooves 30,30 which extend in a direction parallel to the longitudinal axis of the base 12.

Tie down holes, such as indicated at 32,32 in FIG. 1, are or may be provided to receive a wire tie or strap S, shown in FIG. 1, for securing a cable against accidental release from the holder. The rear or mounting surface of 14 is preferably relieved in the region between the apertures 32,32 as indicated by the numeral 34 in FIGS. 1, 2, and 4 to allow a wire tie or cable securing strap to be applied to the hanger after the hanger 10 has been mounted on the surface of a wall or the like.

Figure 3:
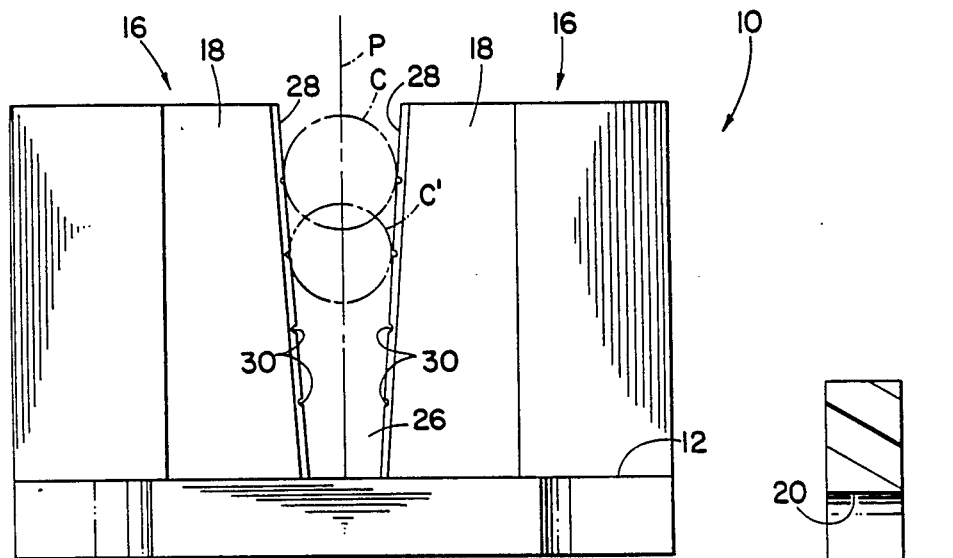
FIG. 3 is a bottom plan view of the cable hanger.
Figure 4:
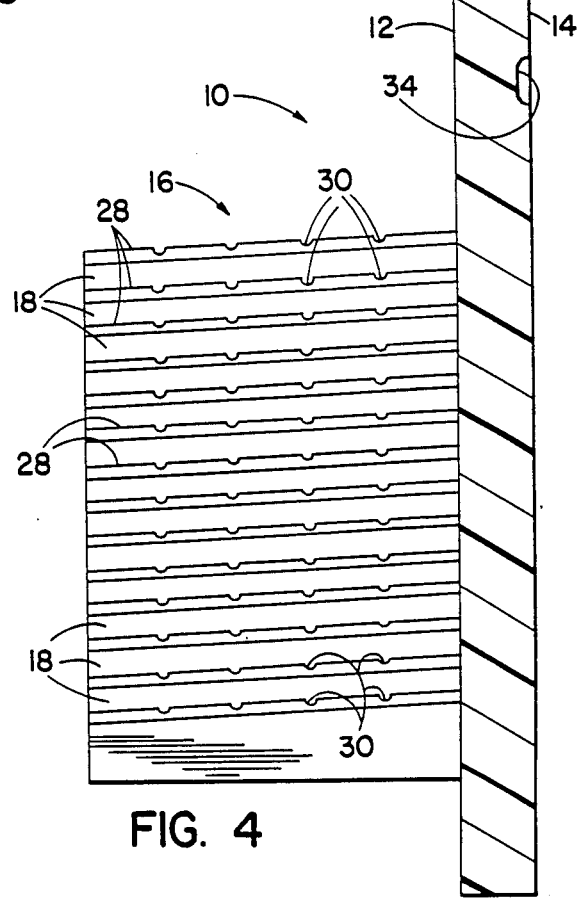
FIG. 4 is a sectional view taken along the line 4—4 of FIG. 1.
Figure 5:
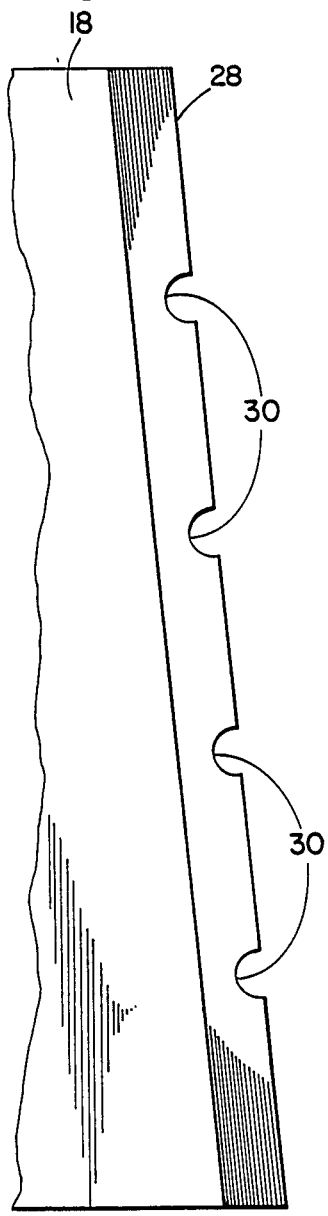
FIG. 5 is a somewhat enlarged fregmentary view of a typical finger taken along the line 5—5 of FIG. 1.
Figure 6:
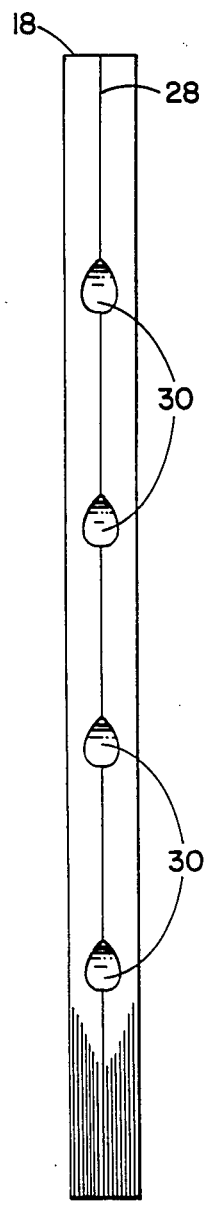
FIG. 6 is an edge view of the finger shown in FIG. 5.
Figure 7:
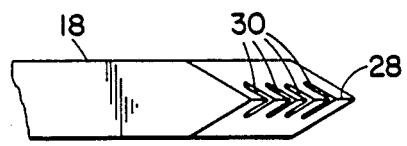
FIG. 7 is an end view of the finger shown in FIG. 5.

A portion of a cable to be secured by the hanger 10 is inserted into the V-shaped groove 26 a sufficient distance to cause diametrically opposite portions of the cable jacket to seat on the edges of associated opposing notches 30,30 and be gripped by opposing resilient fingers 18,18. In FIG. 3 of the drawings the cable C is shown held in position by the hanger 10.

As previously noted, the hanger 10 may be used to secure cable in a range of sizes. In FIG. 3 another cable C, of somewhat smaller diameter than the cable C is shown held in another position within the hanger by the FIGS. 18,18. It will also be evident that the cable hanger 10 may be used to secure other cables of still smaller size (not shown).

The cable C, as it appears in FIG. 1, may be adjusted in an upward direction within and relative to the cable hanger 10 by pushing or pulling the cable upwardly relative to the cable hanger. However, due to the upwardly inclined arrangement of the opposing fingers the cable will resist downward movement relative to the cable hanger. When the cable has been properly adjusted relative to the hanger 10, a wire tie or strap, such as the strap S may be applied to further secure the cable against accidental release from the hanger.

The cable C may be readily released from the hanger 10 by removing the strap S and applying slightly upwardly and forwardly directed force to the cable to release it from the V-shaped groove 26 defined by the fingers 18,18.

We claim:

1. A cable hanger for gripping and securing in fixed position an elongated portion of a cable, said cable hanger comprising a mounting base having a rear mounting surface, a pair of combs supported on and projecting forwardly from said mounting base at opposite sides of an axial plane intersecting said mounting base and normal to said mounting surface, each of said combs having a supporting portion fixed relative to said mounting base and a multiplicity of integral resiliently flexible spaced apart fingers projecting from said supporting portion in parallel relation to each other and extending forwardly from said base portion in generally normal relation to said mounting surface, said fingers having elongated free ends disposed in opposing spaced apart relation to each other at opposite sides of said plane, said fingers being inclined to said axial plane and in the direction of one end of said mounting base, said fingers being free to move relative to said supporting portion and said mounting base and relative to each other, said free ends cooperating to define a generally V-shaped forwardly open groove converging toward said mounting base and toward an apex within said axial plane and having a substantially uniform cross-section throughout its length for receiving and gripping an axially elongated portion of a cable positioned therein and between said opposing free ends of said fingers.

2. A cable hanger as set forth in claim 1 wherein said opposing free ends define a plurality of parallel rows of opposing notches of substantially equal size.

3. A cable hanger for gripping and securing in fixed position an axially elongated portion of a cable, said cable hanger comprising a mounting base having a rearwardly facing mounting surface, a pair of opposing combs supported on and projecting forwardly from said mounting base at opposite sides of an axial plane intersecting said mounting base and normal to said mounting surface, each of said combs having a finger supporting portion fixed relative to said mounting base and a multiplicity of integral flexible resilient spaced apart fingers projecting in parallel relation to each other from said finger supporting portion, said fingers of each of said combs extending forwardly from said mounting base in generally normal relation to said mounting surface annd defining forwardly extending slots therebetween, said fingers of each of said combs being inclined to said axial plane and in the direction of one end of said mounting base, said fingers being free to move relative to said supporting portion and said mounting base and relative to each other, said fingers of said opposing combs having free ends disposed in opposing spaced apart relation to each other at opposite sides of said axial plane, said free ends cooperating to define a forwardly open generally V-shaped groove converging toward said mounting base and toward an apex disposed within said axial plane, said V-shaped groove having a substantially uniform cross-section throughout its length, said free end portions defining opposing parallel rows of notches of substantially uniform size at opposite sides of said axial plane.

4. A cable hanger as set forth in claim 3 including additional means for securing a cable to said mounting base.

5. A cable hanger as set forth in claim 4 wherein said additional means comprises a pair of spaced apart holes through said mounting base and a cable tie threaded through said holes for tying the cable to said mounting base.

* * * * *